United States Patent [19]
Desbois

[11] 3,808,910
[45] May 7, 1974

[54] FOOT SHIELD FOR CYCLISTS

[76] Inventor: Roger J. Desbois, 108 rue Chevreul, Nanterre, France

[22] Filed: Nov. 24, 1972

[21] Appl. No.: 309,595

[30] Foreign Application Priority Data
Dec. 17, 1971 France .............................. 71.45434
Oct. 23, 1972 France .............................. 72.37440

[52] U.S. Cl. .............................................. 74/594.6
[51] Int. Cl. ............................................. B62m 3/08
[58] Field of Search ........................ 74/594.6, 594.4

[56] References Cited
UNITED STATES PATENTS
2,831,370  4/1958  Smith ................................ 74/594.6
2,603,104  7/1952  Isaac ................................. 74/594.6
1,651,084  6/1900  Oppenheim, Jr. ................. 74/594.6

*Primary Examiner*—Samuel Scott
*Assistant Examiner*—F. D. Shoemaker
*Attorney, Agent, or Firm*—Waters, Roditi, Schwartz & Nissen

[57] ABSTRACT

For use with bicycle pedals provided with apertures on end faces for fastening toe-clips thereto, a foot shield comprising a casing for covering the top of the toe of the foot when disposed on the pedal, and having beneath the bottom face of the shield a wall perpendicular to said face and of dimensions substantially equal to those of the pedal end face, the wall having apertures corresponding with the toe-clips fastening apertures in the pedal end face.

9 Claims, 4 Drawing Figures

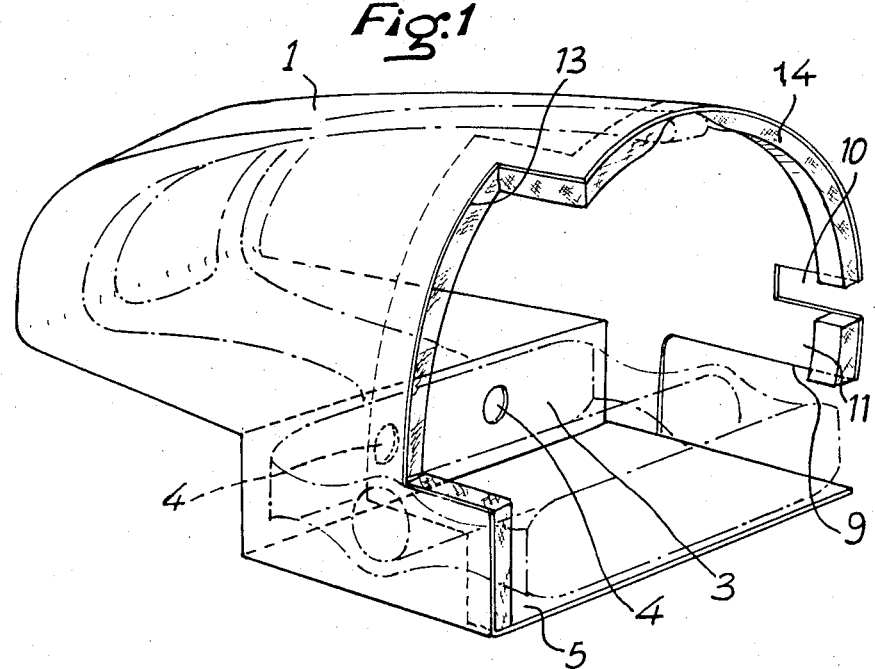
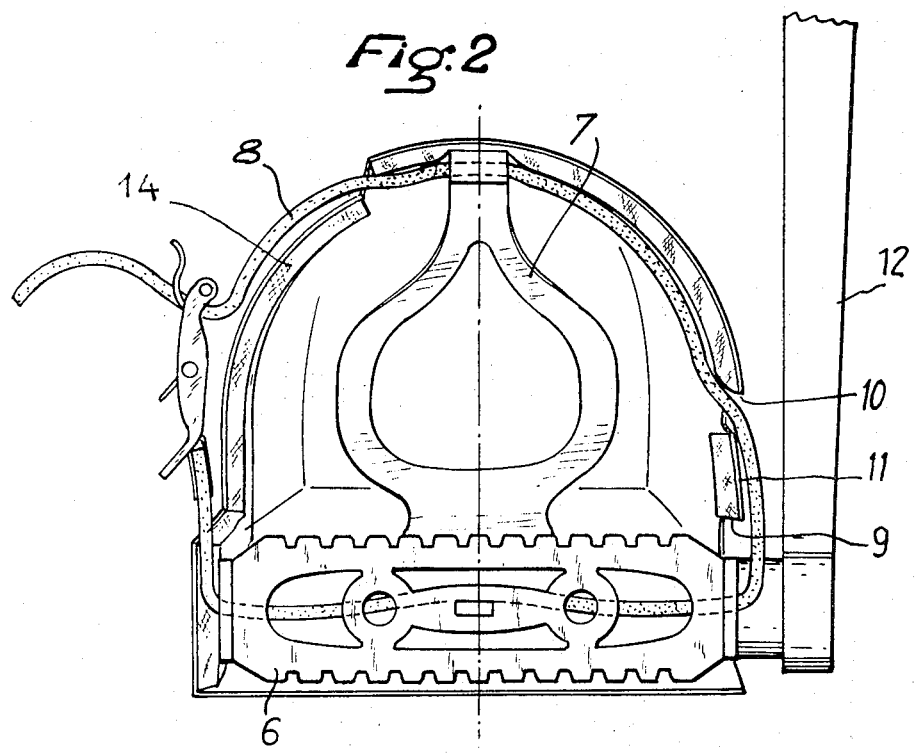

FOOT SHIELD FOR CYCLISTS

BACKGROUND OF THE INVENTION

1. Field of the Invention

The invention relates to a foot shield which protects the tip of a cyclist's foot against wind, rain, cold, and mud.

2. Description of the Prior Art

It is in fact known that in addition to rain, snow, or mud, one of the greatest inconveniences encountered in cycling in cold weather is the chilling of the extremities, particularly the tip of the foot.

French Patents No. 904,418 and No. 989,183, Certificate of Addition No. 57,111, Swiss Patent No. 205,395, and Danish Patent No. 60,427 have already disclosed foot shields for cyclists. Known foot shields are designed to be fastened either to the top face or to the bottom face of the pedals.

This entails the disadvantage that it is necessary to use additional fastening elements which are attached to or pass through the pedal. In addition, when the foot shield is fastened to the top face of a pedal, it becomes impossible to use a toe-clip to be attached to the pedal.

SUMMARY OF THE INVENTION

The main object of the present invention is to provide a foot shield which permits the use of a toe-clip attached to the pedal and which can be fastened to the pedal without any additional part or accessory passing through the pedal.

According to the invention for use with a bicycle pedal provided with at least one aperture on an end face thereof to receive toe-clip fastening means, a foot-shield comprising a casing shaped to cover the toe of a foot on said pedal, a bottom face on said shield to underlie said toe, a wall substantially perpendicular to said bottom face and having dimensions substantially equal to the end face of said pedal, and at least one aperture in said wall corresponding to said at least one aperture in said pedal for said toe-clip fastening means.

BRIEF DESCRIPTION OF THE DRAWINGS

In order that the invention may be more fully understood some embodiments in accordance therewith will now be described by way of example with reference to the accompanying drawings, in which:

FIG. 1 is a perspective view in perspective of a foot shield;

FIG. 2 is a rear view of the foot shield of FIG. 1 fastened to a pedal provided with a toe-clip;

DESCRIPTION OF PREFERRED EMBODIMENTS

Figure 3:
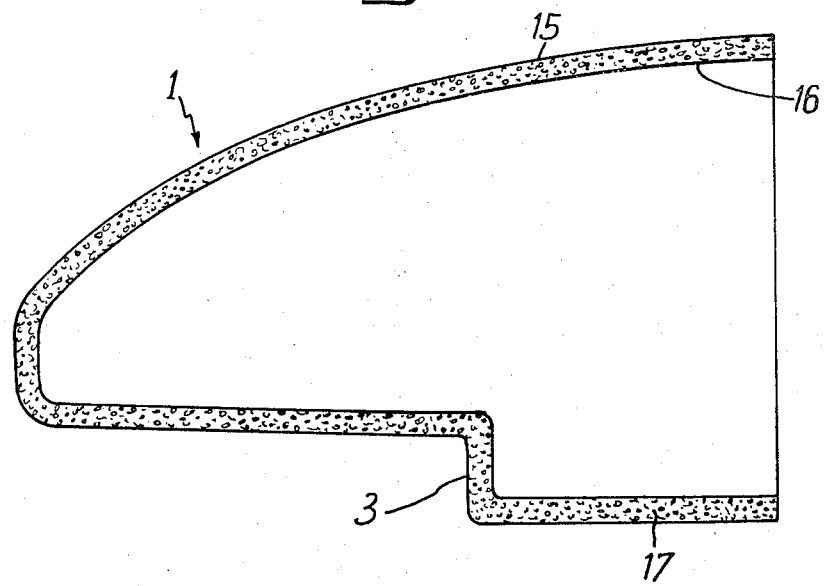
FIG. 3 is an elevation view in section of a second form of construction of a foot shield.

In the drawings, FIGS. 1 and 2 show a foot shield composed of a casing 1 designed to cover the tip of a shoe and provided beneath its bottom face with a wall 3 perpendicular thereto.

The dimensions of the wall 3 correspond substantially in height and width to the end face of a pedal, which is shown in dot-and-dash lines in FIG. 1 and is provided with a toe-clip.

The wall 3 serves to fasten the foot shield to the pedal. It is provided with two holes 4 corresponding to the holes which are normally provided on the end faces of pedals to permit the attachment of toe-clips. The bolts serving to fasten the toe-clip are also used for fastening the foot shield.

Thus no additional part is necessary for fastening the foot shield. In addition, the latter can be used very easily with or without a toe-clip, as is suggested by FIG. 1.

Starting from its bottom edge, the wall 3 is preferably extended under the pedal, parallel to the bottom face thereof, by an extension 5 the dimensions of which correspond substantially to the bottom face of the pedal. The side edges of the extension 5 are joined to the bottom edges of the casing enclosing the upper face of the pedal. In other words, the foot shield encloses the entire pedal by a flat face extending under the pedal.

FIG. 2 shows how the foot shield may be fitted on a pedal 6 equipped with a toe-clip 7 having a securing strap 8.

To enable the foot shield to be passed over the pedal, the inner free edge of the casing has a cutout 9, allowing the pedal spindle and the strap 8 to pass through. Above the cutout 9 there is formed a slot 10 through which the strap 8 passes into the interior of the casing. Consequently, a portion 11 of the edge of the casing, between the cutout 9 and the slot 10, is covered and gripped by the strap 8 (see FIG. 2). This ensures that the pedal crank 12 cannot foul the inner edge of the casing 1.

At the outer edge of the casing is a recess 13 which exposes the means of tightening the strap and gives ready access thereto.

The foot shield is preferably of a transparent plastic material, which has a thickness of about 0.5 to 2 mm and is airtight and watertight and constitutes a good thermal insulator, suitable material being for example selected from the groups comprising the polycarbonates, polyamides, methylacrylates, and polystyrenes.

In addition, in order to improve the thermal insulation of the foot shield, a pad 14, for example of foamed plastic material, with a square section of about 15 × 15 mm may be adhesively bonded along the rear edge, and the inner face, of the foot shield.

A foot shield constructed as described with reference to FIGS. 1 and 2 but having an increased thermal insulation effect may be obtained by constructing it in accordance with FIGS. 3 and 4.

The foot shield shown in FIG. 3 is made in one piece, with a wall having a thickness of about 5 mm, of cellular plastic material provided with smooth surfaces.

It may be produced with the aid of a metal mould comprising two parts spaced apart from one another by a distance equal to the desired wall thickness. It is for example possible to use a known polyurethane foam, which is poured in the cold state between the two parts of the mould. A casing 1 is obtained which has superficially smooth faces 15, 16 and with a cellulose structure 17 between these faces.

The casing 1 is moulded in its final shape complete with the vertical wall 3 for fastening to a pedal.

Figure 4:
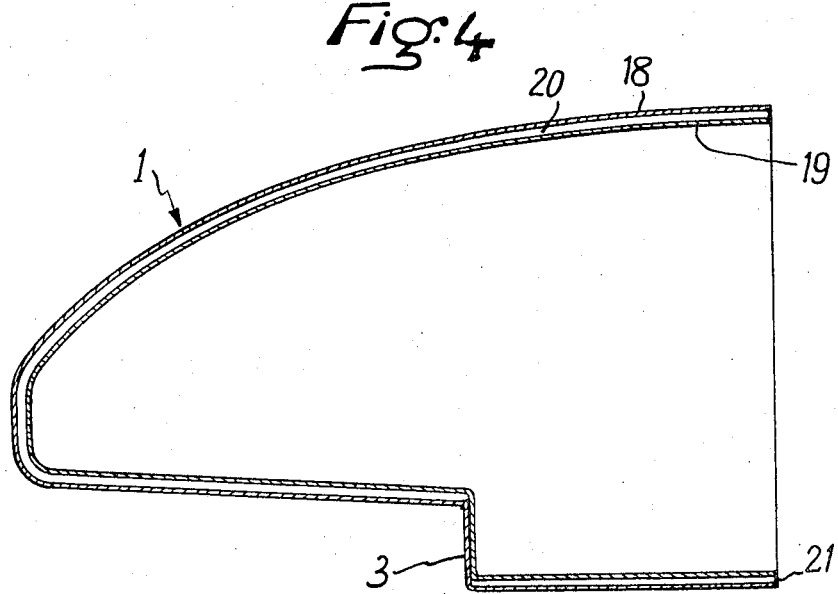
FIG. 4 is a view, similar to FIG. 3, of a third form of foot shield.

FIG. 4 shows another insulating foot shield 1 composed of two separate shells 18, 19, each of which has a thickness of about 0.5 mm and both of which are made of solid rigid material. These two shells are spaced about 3 mm apart, thus forming between them an insulating air layer, except between the two walls 3 which lie one against the other. The screws for fastening the foot shield to a pedal pass through the walls 3 and contribute towards holding together the two shells 18, 19 joined to one another. If desired, a layer of adhesive may be provided between the two walls 3 when the two shells are joined together. In addition, the rear free edges of the shells are joined to one another at 21 by welding which holds them the desired distance apart and closes the gap or interior space 20 separating them. This welding may be effected in any known manner. Adhesive bonding is also possible.

By adopting a sufficiently rigid material it is possible to form a substantial degree of vacuum in the space 20, thus increasing still further the insulation provided by the foot shield.

As an alternative, the face of one of the two shells may be provided with protuberances serving as spacers and holding the shells apart against the action of atmospheric pressure.

A suitable thickness of the material of which each shell is made is at least 0.5 mm; similarly, their spacing may be fixed within a range of about 2 to 4 mm.

The foot shield may be made of opaque or transparent material.

I claim:

1. For use with a bicycle pedal provided with at least one aperture on an end face thereof to receive toe-clip fastening means, a foot-shield comprising a casing shaped to cover the toe of a foot on said pedal, a bottom face on said shield to underlie said toe, a wall substantially perpendicular to said bottom face and having dimensions substantially equal to the end face of said pedal, at least one aperture in said wall corresponding to said at least one aperture in said pedal for said toe-clip fastening means, and an extension extending from the free edge of said wall approximately parallel to said bottom face to cover the bottom face of said pedal, said extension being connected to said casing for enclosing side portions of said pedal.

2. A foot shield according to claim 1, wherein the outer free edge of said casing has a recess for receiving securing means of a toe-clip, while its inner free edge has a cutout shaped so that a spindle of the pedal and the securing means of the toe-clip can pass therethrough.

3. A foot shield according to claim 2, wherein the inner free edge of the casing has a slot disposed at a distance from the cutout and through which in the use the toe-clip strap passes into the interior of the casing after passing over the portion of the edge which is between the cutout and the slot.

4. A foot shield according to claim 1, wherein said casing is made of a moulded plastic material selected from the group consisting of polycarbonates, polyamides, methacrylates, and polystyrenes.

5. A foot shield according to claim 1, wherein the foot shield is provided on its inner face along its rear edge with a padding of foamed synthetic material.

6. A foot shield according to claim 1, wherein the foot shield has smooth surfaces and includes a cellulose structure.

7. A foot shield according to claim 1, wherein said casing includes two shells spaced apart and secured together.

8. A foot shield according to claim 7, wherein said two shells have rear free edges joined together in spaced relation in a fluid-tight manner the shells having two contacting wall portions for fastening to a pedal and joined together in a fluid-tight manner.

9. A foot shield according to claim 8, wherein at least a partial vacuum is provided in the gap separating the two shells.

* * * * *